G. F. Fessenden.
Castanet.
No. 90,832.          Patented Jan. 1, 1869.
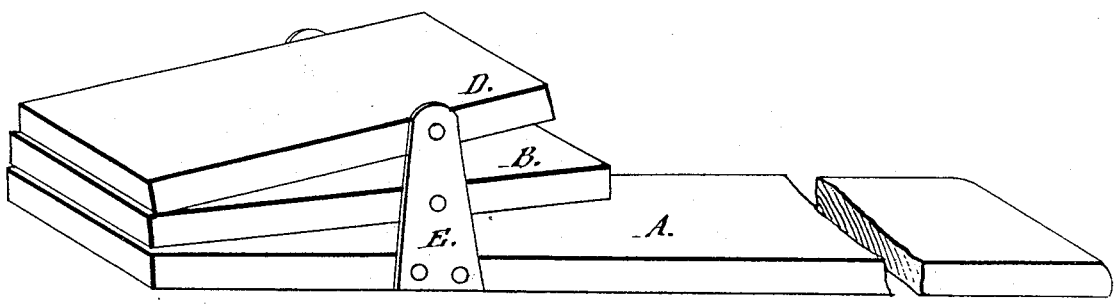
WITNESSES:
L. B. Wright
Austin S. Howarth
INVENTOR:
Geo. F. Fessenden
by
Carroll Wright,
Attorney

United States Patent Office.

GEORGE F. FESSENDEN, OF ARLINGTON, MASSACHUSETTS.

Letters Patent No. 90,832, dated June 1, 1869.

IMPROVEMENT IN CASTANETS.

The Schedule referred to in these Letters Patent and making part of the same.

*To whom it may concern:*

Be it known that I, GEORGE F. FESSENDEN, of Arlington, county of Middlesex, and State of Massachusetts, have made certain Improvements in Clappers or Castanets; and do hereby declare the following to be a full, clear, and exact description thereof, reference being had to the accompanying drawing, in which is shown my improved castanet or clapper.

My object is to produce clappers, for use of musicians, and as toys, that will be capable of more effect, and that can be more easily operated, than the ordinary clapper or "bones;" and The nature of my invention consists in having one or more extra pieces, so attached to the main piece that each movement of the main piece will produce a movement of the auxiliary pieces.

In the drawing—

A is the main piece, and B D, the auxiliary pieces, attached to upright arm E, in such a manner, that, when unemployed, the outer ends of the pieces B D rest, the under one upon A, and the upper one upon B, while the opposite ends are kept apart, as shown; that is, by the space left in attaching the pieces, one or more of these auxiliary pieces may be employed; but I find that two is a convenient number.

The operation and effect produced in rattling these clappers are sufficiently indicated by the drawing.

My improved castanets or clappers may be made of any suitable material, wood, bone, metal, &c.

What I claim as new, and desire to secure by Letters Patent, is—

Castanets or clappers composed of main piece A and one or more auxiliary pieces attached to main piece, substantially as shown and described.

In testimony whereof, I have signed my name to this specification, in the presence of two subscribing witnesses.

GEORGE F. FESSENDEN.

Witnesses:
CARROLL D. WRIGHT,
AUSTIN S. HOWARTH.